(12) United States Patent
Mojana et al.

(10) Patent No.: US 7,674,359 B2
(45) Date of Patent: Mar. 9, 2010

(54) CYLINDRICAL ELECTRODE

(75) Inventors: Corrado Mojana, Valmadrera (IT); Luca Buonerba, Milan (IT); Paolo Rossi, Milan (IT)

(73) Assignee: Industrie De Nora S.p.A., Milan (IT)

( * ) Notice: Subject to any disclaimer, the term of this patent is extended or adjusted under 35 U.S.C. 154(b) by 314 days.

(21) Appl. No.: 11/851,109

(22) Filed: Sep. 6, 2007

(65) Prior Publication Data

US 2008/0053823 A1 Mar. 6, 2008

Related U.S. Application Data

(63) Continuation of application No. PCT/EP2006/002191, filed on Mar. 9, 2006.

(51) Int. Cl.
*C25B 11/02* (2006.01)
*C25B 11/03* (2006.01)

(52) U.S. Cl. ............... 204/284; 204/280; 204/260; 204/272

(58) Field of Classification Search ............ 204/280, 204/284, 260, 272
See application file for complete search history.

(56) References Cited

U.S. PATENT DOCUMENTS

| | | | |
|---|---|---|---|
| 4,276,147 A | 6/1981 | Epner et al. | |
| 5,215,722 A * | 6/1993 | Nishizawa | 422/174 |
| 5,635,040 A | 6/1997 | Bakhir et al. | |
| 5,788,820 A | 8/1998 | Liu | |
| 5,852,274 A * | 12/1998 | Watanabe et al. | 219/117.1 |
| 6,451,183 B1 | 9/2002 | Treasure et al. | |
| 6,783,679 B1 | 8/2004 | Rozich | |
| 2003/0000848 A1 | 1/2003 | Lipsztajn et al. | |
| 2003/0010639 A1 | 1/2003 | Legatski et al. | |
| 2003/0059665 A1* | 3/2003 | Blum et al. | 429/40 |
| 2003/0190514 A1* | 10/2003 | Okada et al. | 429/31 |
| 2005/0082160 A1* | 4/2005 | Botvinnik | 204/164 |
| 2006/0134489 A1* | 6/2006 | Sarkar et al. | 429/31 |
| 2007/0098614 A1* | 5/2007 | Iida et al. | 423/245.3 |

FOREIGN PATENT DOCUMENTS

| | | |
|---|---|---|
| DE | 19749445 C1 | 2/1999 |
| JP | 2001198574 | 7/2001 |

* cited by examiner

*Primary Examiner*—Bruce F Bell
(74) *Attorney, Agent, or Firm*—Eschweiler & Associates, LLC

(57) ABSTRACT

The invention relates to a cylindrical electrode for gas evolution comprising a non-activated conductive core whereto an easily detachable and replaceable component provided with catalytic activation is secured, for instance an undulated sheet or a mesh.

20 Claims, 3 Drawing Sheets

US 7,674,359 B2

CYLINDRICAL ELECTRODE

REFERENCE TO RELATED APPLICATION

This application is a continuation of PCT/EP2006/002191, filed Mar. 9, 2006, that claims the benefit of the priority date of Italian Patent Application No. MI2005A000373, filed on Mar. 9, 2005, the contents of which are herein incorporated by reference in their entirety.

FIELD OF THE INVENTION

The invention is relative to an electrode of cylindrical geometry for electrochemical processes, particularly a cylindrical electrode comprising a central metallic conductor with a superficial catalytic activation.

BACKGROUND

The utilisation of electrodes of cylindrical geometry is known in several sectors of electrochemistry. Cylindrical electrodes, in the majority of cases concentrically disposed inside hollow cylindrical counter-electrodes, are currently employed in electrodialysis, water electrolysis, ozone production, and other applications. The most important processes making use of cylindrical-type, mostly coaxial, electrodic geometries are for the recovery of metals from aqueous solutions and the treatment of waste water (industrial wastes, civil waters and others), for the potabilisation or purification thereof from various contaminants. The cylindrical geometries, especially on small-size electrochemical cells, offer substantial advantages particularly in terms of fluid distribution. Depending on the process under consideration, the cylindrical electrodes can be both anodes or cathodes. In the majority of cases, such electrodes are suitable for gas evolution reactions, for instance hydrogen cathodic evolution or oxygen, ozone or chlorine anodic evolution. The gas-evolving reactions, in particular the anodic ones, must be catalysed in order to take place with a sufficient efficiency. The cylindrical electrodes of the prior art, therefore, consist of a metal cylindrical conductive support (usually titanium or other valve metal, in the case of anodes) coated with catalysts usually based on metal oxides, depending on the type of the gas to be evolved and of the required potential, as widely known. The application process of the catalytic coating to the cylindrical support provides painting the latter with a precursor, and the subsequent conversion of the precursor by means of a high temperature thermal treatment (350-700° C.). The painting of metallic electrodes with precursor solutions is preferably carried out by electrostatic spraying processes. The cylindrical geometry is, in this case, less favourable than the planar one in terms of homogeneity of application. Furthermore, the catalytic coatings have a limited operative lifetime (indicatively 1 to 5 years depending on the applications). Once the original coating is exhausted, it must be completely removed by mechanical means and restored. The coating removal operation is particularly onerous for cylindrical geometries, especially for those of small size. In any case, the prolonged times required for restoring the catalytic activity of the electrodes lead to undesirable limitations to the plant operation, alternatively imposing a temporary interruption of the production, an oversize of the whole plant to allow a planned cyclic electrode reactivation, or the need of storing a remarkable amount of replacement electrodes, which is a very onerous solution from the investment cost standpoint.

It would be desirable, therefore, to provide a cylindrical electrode for electrochemical processes overcoming the limitations of the prior art. It would be further desirable to provide a cylindrical electrode allowing an increased easiness of application or of restoring of the catalytic coating. It would be still further desirable to provide an improved method for the catalytic reactivation of a cylindrical electrode in terms of process management efficiency.

SUMMARY OF THE INVENTION

In one embodiment, the invention is directed to an electrode for gas evolution comprising a conductive cylindrical core and a metal sheet or mesh fixed externally thereto and in electric contact therewith, wherein said metal sheet or mesh is an undulated sheet rolled on itself and welded along two opposed sides so as to form a cylinder of original diameter lower than that of said cylindrical core and forcedly inserted thereon.

In another embodiment, the invention is directed to an electrode for gas evolution comprising a conductive cylindrical core and a metal sheet or mesh fixed externally thereto and in electric contact therewith, wherein one side of said metal sheet or mesh is welded to said cylindrical core along a generatrix thereof, and said sheet or mesh is rolled around said conductive core.

In a further embodiment, the invention is directed to a method for the reactivation of a cylindrical electrode provided with exhausted catalytic coating, comprising inserting thereon an undulated sheet rolled on itself and welded along two opposed sides so as to form a cylinder, said undulated sheet being provided with catalytic coating.

In another embodiment, the invention is directed to a method for the reactivation of a cylindrical electrode provided with exhausted catalytic coating, comprising welding along a generatrix thereof an edge of a metal sheet or mesh provided with catalytic coating, and rolling said metal sheet or mesh around the cylindrical electrode, optionally securing the opposed edge of said metal sheet or mesh to said welded edge and/or said cylindrical electrode by means of weld spots.

BRIEF DESCRIPTION OF THE FIGURES

The invention will be described hereafter with the support of the following figures.

DETAILED DESCRIPTION

The invention is relative to an electrode for gas evolution comprising a conductive core acting as current collector, whereto a detachable component is externally secured, for instance a mesh or a solid, perforated or expanded sheet, made of conductive material. In one embodiment, the detachable component is provided with a catalytic coating and constitutes the active element of the electrode. The electrodic geometry of the invention is particularly suited to the construction of anodes for oxygen, ozone or chlorine evolution in electrometallurgical or water-treatment processes. In this case, the conductive cylindrical core is advantageously made of a valve metal, in the most typical case titanium. The cylindrical core may have any size, the most typical diameter being comprised between 1 and 25 cm, depending on the application. The detachable component comprises a metallic mesh or sheet, which may be advantageously made of the same material of the conductive core, having thickness comprised between 0.3 and 0.8 mm even though other thicknesses are equally possible.

In another embodiment, the invention is relative to a method for the reactivation of a cylindrical anode provided with an exhausted catalytic coating, comprising the application of a detachable element provided with a catalytic coating externally thereto.

Figure 1A:
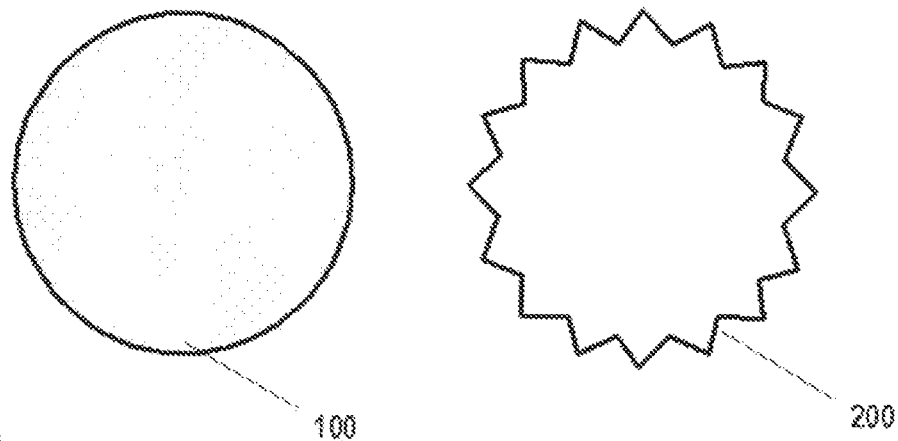
FIG. 1A illustrates a plan view of an electrode in accordance with an embodiment of the invention in which the cylindrical conductive core and the metallic sheet or mesh are separate components.
Figure 1B:
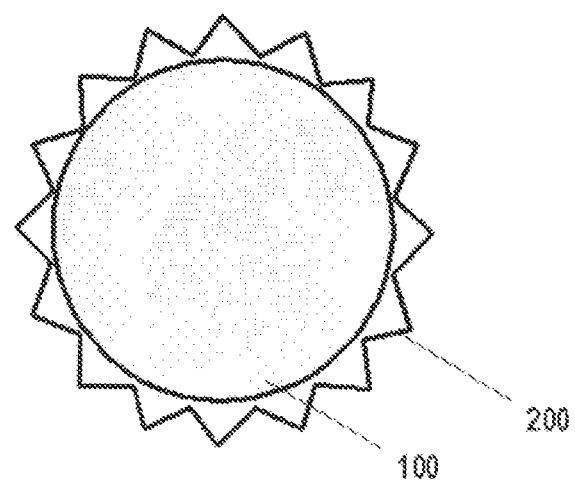
FIG. 1B illustrates a plan view of an electrode in accordance with an embodiment of the invention in which the components of FIG. 1A are assembled.
Figure 1C:
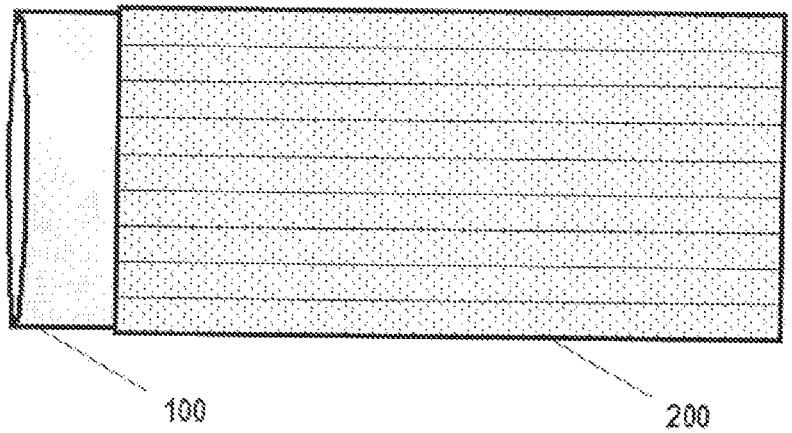
FIG. 1C illustrates a side-view of the components of FIG. 1A as assembled.

Referring to FIGS. 1A-C, a first embodiment of the electrode of the invention is shown. In particular, in FIG. 1A is shown a plan-view of a cylindrical conductor (100), which may consist of a metal rod or hollow cylinder, for instance of titanium or in the case of a cathode of stainless steel. The cylindrical conductor (100), which will act as the conductive cylindrical core of the electrode of the invention once assembled, may also be a cylindrical electrode of the prior art, for instance an electrode having an exhausted catalytic coating.

In FIG. 1A there is shown the plan-view of an undulated metal sheet 200 rolled up, closed on itself and welded so as to form a corrugated cylinder, provided with a superficial catalytic coating at least on the external surface. In the figure, the corrugations of the undulated sheet are not represented in real scale, but largely exaggerated for a better understanding of the drawing. In one embodiment, the sheet (200) can be replaced by an undulated mesh of equivalent geometry. The diameter of the sheet (200) rolled in a cylinder is slightly lower than that of the conductive core (100), but the undulated geometry is such as to impart a certain flexibility thereto, so that it may be forcedly inserted on the core itself. The flexibility is higher for undulated sheets of reduced thickness (typically 0.5 mm, in any case comprised between 0.3 and 1 mm).

FIG. 1B shows the two pieces in a plan-view after assembly. After inserting the undulated sheet (200), the two pieces may be further secured by means of weld spots (not shown). FIG. 1C shows the same assembly as a side-view. As can be seen, particularly from FIG. 1B, compared to the catalytic activation obtainable directly on a cylindrical conductor, the use of an undulated sheet has the clear advantage of sensibly increasing the active surface. Moreover, once exhausted the catalytic coating, the sheet (200) may be easily removed and replaced with another previously activated one directly on site, with minimum shut-down times and with the only need of keeping the activated sheets stored on site, rather than a series of complete electrodes. In this way, the handling costs of the material in the case of a reactivation are also reduced.

Figure 2A:
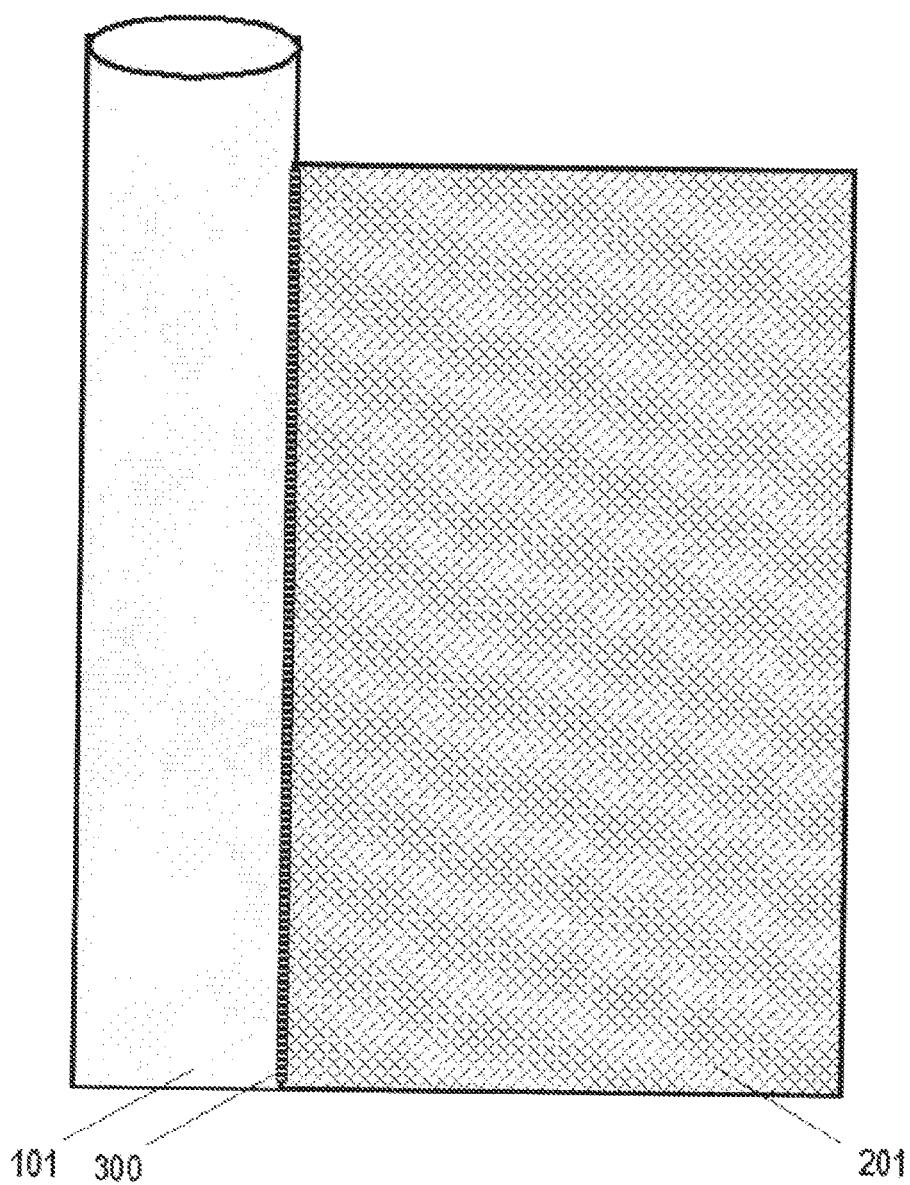
FIG. 2A illustrates a plan view of an electrode in accordance with another embodiment of the invention in which the metallic sheet or mesh is welded along a generatrix of the conductive core.
Figure 2B:
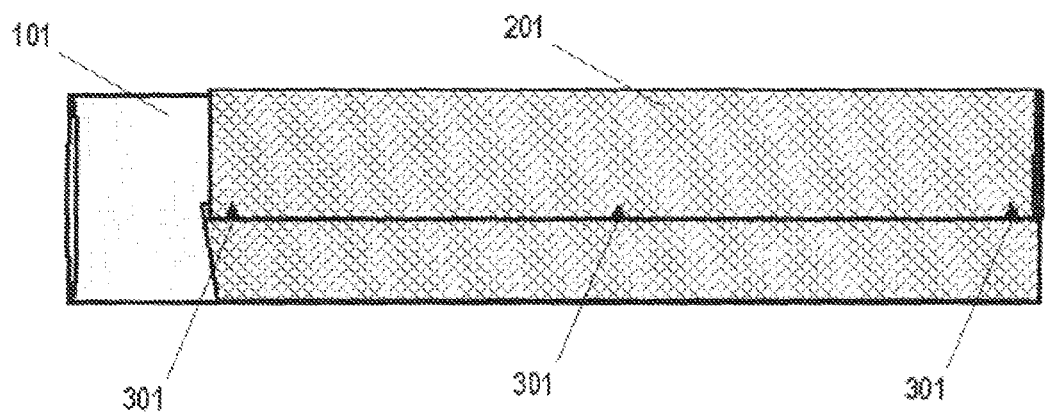
FIG. 2B illustrates a plan view of an electrode in accordance with an embodiment of the invention in which the metallic sheet or mesh is rolled around the conductive core and fixed with weld spots.

FIGS. 2A-B illustrate another embodiment of the invention. In particular, FIG. 2A shows a cylindrical conductor (101), which may comprise a metal rod or hollow cylinder, for instance of titanium or other valve metal in the case of an anode, or of nickel or stainless steel in the case of a cathode. The cylindrical conductor (101) may be a cylindrical electrode of the prior art, for instance an electrode with an exhausted catalytic coating.

A mesh (201) provided with a catalytic coating is flag-welded along the generatrix of the cylindrical conductor (101). The figure shows the junction of the two pieces as a continuous weld (300), for instance obtainable via laser, but also different types of welding such as spot welding are possible. The mesh (201) may also comprise an expanded or perforated sheet or a solid sheet. FIG. 2B shows as in a subsequent step the mesh (201) is folded back so as to enclose the cylindrical core and welded on itself by means of the spot welds (301) after overlapping the opposed edges. In one embodiment, the mesh (201) may have non overlapping edges, both welded to the conductive core (101). The spot welding (301) may also be replaced by another type of fixing, for example a continuous welding. Also in this case, an appropriate geometry of the mesh (201) may allow a substantial increase of the active surface of the obtained electrode with respect to the direct activation of the cylindrical conductor. Furthermore, the metallic mesh (201) externally secured to the cylindrical core (101) may be easily replaced once exhausted of the catalytic activation, and replaced with a new one.

The following example is included to demonstrate particular embodiments of the invention. It should be appreciated by those of skill in the art that the techniques disclosed in the examples which follow represent techniques discovered by the inventors to function well in the practice of the invention. However, those of skill in the art should, in light of the present disclosure, appreciate that many changes can be made in the specific embodiments which are disclosed and still obtain a like or similar result without departing from the spirit and scope of the invention.

Example

A titanium cylindrical anode for a cell employed in copper electrodeposition tubular cells disclosed in U.S. Pat. No. 6,451,183, consisting of a 15 cm thick titanium hollow cylinder, was activated with a titanium and tantalum oxide-based coating (16 g/m$^2$ overall) over a titanium and tantalum oxide-based intermediate layer, as known in the art. The anode was subjected to a standard oxygen evolution test in 5% sulphuric solution at a temperature of 25° C. and at a current density of 500 A/m$^2$. In the course of eight hours of test a stable voltage of 3.30 V was detected (electrode according to the prior art).

An electrode according to the invention was prepared making use of an identical titanium rod free of catalytic activation, whereto a 0.5 mm thick titanium mesh activated with the same composition of the previous sample according to the prior art was secured, utilising the configuration shown in FIG. 2. The activated mesh was therefore firstly secured along a generatrix of the cylinder by continuous welding, then rolled around itself and fixed by means of three weld spots.

The electrode was subjected to the same oxygen evolution test of the previous sample, at identical process conditions. In the course of eight hours of test, a stable voltage of 2.90 V was detected (electrode of the invention).

It was thereby shown how the electrode of the invention, besides solving the inconveniences of the prior art mainly associated with the reactivation of exhausted cylindrical electrodes in a very practical fashion, is also capable, probably due to the greater exposed surface, to operate at a higher energy efficiency (lower voltage) corresponding to a higher expected lifetime.

Although the disclosure has been shown and described with respect to one or more embodiments and/or implementations, equivalent alterations and/or modifications will occur to others skilled in the art based upon a reading and understanding of this specification. The disclosure is intended to include all such modifications and alterations and is limited only by the scope of the following claims. In addition, while a particular feature may have been disclosed with respect to only one of several embodiments and/or implementations, such feature may be combined with one or more other features of the other embodiments and/or implementations as may be desired and/or advantageous for any given or particular application. Furthermore, to the extent that the terms "includes", "having", "has", "with", or variants thereof are used in either the detailed description or the claims, such terms are intended to be inclusive in a manner similar to the term "comprising."

What we claim is:

1. Electrode for gas evolution comprising a conductive cylindrical core and a metal sheet or mesh fixed externally thereto and in electric contact therewith, wherein said metal sheet or mesh is an undulated sheet rolled on itself and welded along two opposed sides so as to form a cylinder of original diameter lower than that of said cylindrical core and forcedly inserted thereon.

2. The electrode of claim 1, wherein the undulated sheet rolled into a cylinder and inserted on said conductive core is secured to said conductive core by means of weld spots.

3. The electrode of claim 1, the undulated sheet having a thickness between 0.3 mm and 1 mm.

4. The electrode of claim 1, the conductive cylindrical core comprising titanium or other valve metal.

5. The electrode of claim 1, the conductive cylindrical core having a diameter comprised between 1 and 25 cm.

6. The electrode of claim 1, the metal sheet or mesh being activated with a catalytic coating for chlorine, ozone or oxygen evolution.

7. The electrode of claim 1, the metal sheet or mesh being activated with a catalytic coating for high-overvoltage oxygen evolution.

8. An electrolysis cell for the anodic evolution of oxygen in a metal electrodeposition process containing the electrode of claim 1.

9. An electrolysis cell for the anodic evolution of oxygen, chlorine or ozone in a water treatment process containing the electrode of claim 1.

10. Electrode for gas evolution comprising a conductive cylindrical core and a metal sheet or mesh fixed externally thereto and in electric contact therewith, wherein one side of said metal sheet or mesh is welded to said cylindrical core along a generatrix thereof, and said sheet or mesh is rolled around said conductive core.

11. The electrode of claim 10, wherein the metal sheet or mesh has a thickness between 0.3 mm and 1 mm.

12. The electrode of claim 10, the conductive cylindrical core comprising titanium or other valve metal and having a diameter comprised between 1 cm and 25 cm.

13. The electrode of claim 10, the metal sheet or mesh being activated with a catalytic coating for chlorine, ozone or oxygen evolution.

14. The electrode of claim 10, the metal sheet or mesh being activated with a catalytic coating for high-overvoltage oxygen evolution.

15. An electrolysis cell for the anodic evolution of oxygen in a metal electrodeposition process containing the electrode of claim 10.

16. An electrolysis cell for the anodic evolution of oxygen, chlorine or ozone in a water treatment process containing the electrode of claim 10.

17. Method for the reactivation of a cylindrical electrode provided with exhausted catalytic coating, comprising inserting thereon an undulated sheet rolled on itself and welded along two opposed sides so as to form a cylinder, said undulated sheet being provided with catalytic coating.

18. The method of claim 17, wherein said undulated sheet rolled on itself forms a cylinder of lower diameter than the cylindrical electrode.

19. The method of claim 17, further comprising securing said undulated sheet to the cylindrical electrode by means of weld spots.

20. Method for the reactivation of a cylindrical electrode provided with exhausted catalytic coating, comprising welding along a generatrix thereof an edge of a metal sheet or mesh provided with catalytic coating, and rolling said metal sheet or mesh around the cylindrical electrode, optionally securing the opposed edge of said metal sheet or mesh to said welded edge and/or said cylindrical electrode by means of weld spots.

* * * * *